United States Patent [19]

Markarian et al.

[11] 4,161,619

[45] Jul. 17, 1979

[54] ELECTRODE SOCKET DESIGN

[75] Inventors: Kegham M. Markarian, University Heights; Richard D. Matty, Marshallville; Fred E. Svekric, Euclid, all of Ohio

[73] Assignee: Republic Steel Corporation, Cleveland, Ohio

[21] Appl. No.: 850,709

[22] Filed: Nov. 11, 1977

[51] Int. Cl.² ............................................. H05B 7/14
[52] U.S. Cl. ...................................................... 13/18 C
[58] Field of Search ................ 13/18; 174/94 R, 94 S; 403/296, DIG. 5

[56] References Cited

U.S. PATENT DOCUMENTS

| 2,510,230 | 6/1950 | Johnson et al. | 174/94 S X |
| 3,646,240 | 2/1972 | Lewis | 13/18 |
| 3,708,601 | 1/1973 | Kozak | 13/18 |

*Primary Examiner*—R. N. Envall, Jr.
*Attorney, Agent, or Firm*—Watts, Hoffmann, Fisher & Heinke Co.

[57] ABSTRACT

The invention provides an electric-arc furnace electrode assembly having electrode sections of improved structural integrity. A pair of carbonaceous electrode sections are held securely in end-to-end relationship by a pin threaded into a pair of sockets found in the respective ends of the electrode sections. Harmful stress concentrations which occur near the base of the socket are reduced by providing a novel base portion. This is achieved by incorporating a generous radius of curvature intermediate the lower-most socket thread and the base of the socket. All of the socket threads are engaged and a threaded portion of the pin extends beyond the lowermost socket thread without engaging the base of the socket.

12 Claims, 5 Drawing Figures

ELECTRODE SOCKET DESIGN

BACKGROUND OF THE INVENTION

1. Field of the Invention

The invention relates to electric-arc furnace electrodes and, more particularly, to an electrode assembly of the type including abutting carbon or graphite electrode sections which are securely held in end-to-end relationship by a pin threaded into a socket in the end of each electrode section.

2. Description of the Prior Art

Electric-arc furnaces are well known in the steelmaking and metal-smelting industries. In the operation of an electric-arc furnace, an electric arc is established between an electrode and a conductive charge of material in the furnace to melt the furnace charge. Electrode systems in arc furnaces include an electrode, usually formed by a large rod-like member which projects downwardly into the furnace, and a movable electrode support structure, formed by a mast and an electrode holder, located outside the furnace. A drive mechanism lowers and raises the electrode support structure to move the electrode toward and away from the furnace charge. The electrode is connected to an electrical power supply which provides power for establishing the arc.

An arc is established as the electrode is moved toward the charge. After the arc is established, it is stabilized and maintained by controlling the position of the electrode relative to the charge in response to sensed arc conditions. Drive mechanism control circuitry has been employed for governing positioning of the electrode relative to the furnace charge in response to sensed arc conditions after an arc has been established.

Electrodes used in arc furnaces are of two basic types which commonly are referred to as "consumable" and "nonconsumable". Consumable electrodes generally consist of a metallic material which is melted to form a part of the furnace charge. Consumable electrodes are structurally more durable than the nonconsumable electrodes, but these electrodes can also be broken or otherwise damaged when driven into engagement with the furnace charge.

The present disclosure is directed to so-called nonconsumable electrodes usually constructed or connected, rod-like sections which are not consumed in the sense that they do not form a part of the furnace charge. They actually are consumed relatively slowly during use due to arc erosion and oxidation. Typically the materials used as nonconsumable electrodes comprise carbon, graphite, or a similar carbonaceous material which both (a) conducts electricity and (b) is suitable to establish an arc with the furnace charge. As the electrodes are consumed, the remaining portion of the electrode must be advanced gradually toward the material being heated to maintain an appropriate arc. Additional electrode sections must be added one-by-one as the electrode extending into the furnace is advanced and consumed.

In order to join the electrode sections in end-to-end, abutting relationship so that they may be advanced serially into the furnace, each electrode section includes a threaded socket at each end. The threaded sockets extend longitudinally of the electrode and each is adapted to receive a threaded pin. The electrode sections may be joined by first inserting a pin into one of the sockets of the new electrode section to be added and then threading this assembly onto the exposed socket of the last electrode section.

It is desirable that the pins and the electrode sections be of similar material and that the material be rather homogeneous. This is true because (a) the electrode should have consistant current-carrying and arc-establishing characteristics and (b) the pin material, like the electrode should produce gaseous products when consumed so that the furnace charge will not be affected. These carbonaceous materials used suffer from the drawback that their mechanical properties are not well-suited to stresses caused by bending loads. These carbonaceous materials undergo very little elastic and plastic deformations when stressed. Consequently, cracks can be initiated very easily under repeated loads.

Breakage of nonconsumable electrodes has become a serious problem in the industry not only because of the direct costs incurred as a result of breaking the electrodes themselves, but also as a result of consequent production losses and repair and replacement costs.

Electric arc furnaces are normally "three-phase" furnaces in that each furnace includes three separate electrode systems. When an electrode is broken, it normally leaves a large broken-off portion in the furnace. The broken-off portion may or may not be salvagable, but in any event furnace operation must be terminated to enable retrieval of the broken-off portion and replacement of it. Extended idle time of a furnace for repair and replacement of broken electrode results in substantial production losses as well as exposing unbroken electrodes to excessive oxidation.

In the past, one major cause of breakage has occured when a melting operation is commenced. As the operation begins, drive motor controls operate the drive motor to advance the electrode toward the furnace charge. When an arc fails to be properly established as the electrode approaches the furnace charge, the electrode drive motor will drive the electrode into the charge. In the absence of drive motor controls responsive to contact of the furnace charge by the electrode, damage to the electrode is virtually inevitable. This is especially true when the surface struck by the electrode is at an angle with respect to the horizontal, with the result that lateral forces are applied to the electrode.

An improved apparatus for protecting electrodes from damage is taught by U.S. Pat. No. 3,937,869. Force-sensing circuitry monitors forces applied to an electrode system as it is positioned with respect to the furnace. Force-responsive controls inhibit electrode movement in response to predetermined rates of changes in sensed reaction forces during positioning of the electrode. Compensating circuitry continuously compensates for changes in forces arising from electrode weight variations and position changes of the electrode support structure so that the sensitivity of the control apparatus to applied forces which can damage the electrode system remains consistently high.

Although the breakage rate of electrodes in electric-arc furnaces has been reduced, breakage still occurs, especially in furnaces which are not equipped with the system of the referenced patent. Breakage also occurs due to problems which are not solved by the system of the referenced patent.

A particular type of breakage which remains unresolved is that resulting from caving-in of the scrap. When an electrode is lowered during the melting process, high mounds of unmelted scrap may be left surrounding the electrode. Under these conditions melting may reach a stage where the base of the scrap mound becomes unstable, and chunks of scrap tumble down and strike the sides of the electrode column. If the electrodes are comprised of a carbonaceous material, the flexural strength of the electrode column is low, and the scrap cave-in process often results in a broken electrode column.

A failure caused by a bending load on the column usually will occur at the section of highest bending moment and at a location where the stresses are highest. The uppermost electrode socket is subjected to larger bending moments than lower sockets; consequently, this is where the failure usually occurs.

An early electrode socket is shown in Broadwell, U.S. Pat No. 1,510,134, which discloses a straight-sided pin, rounded threads, and a clearance between the pin and the bottom of the socket to prevent "wedging strains" at the bottom of the socket. The pin of Broadwell is tapered slightly at its ends to facilitate coupling with the socket and the threads are rounded, to "afford the maximum contacting surface for electrical conduction."

Later patentees recognized that a barrel-shaped pin, that is, one tapered from its center to its ends, produced better results than the straight-sided pin of Broadwell. The thread designs of the pin and socket also were changed considerably from the rounded thread design of Broadwell. Representative designs are shown by the patents to Stroup, U.S. Pat. No. 2,836,806, and Kaufmann et al, U.S. Pat. No. 2,957,716, which designs failed to reduce breakage to acceptable levels.

Stieber et al, U.S. Pat. No. 3,612,586, theorized that the most important factor in strengthening a connection was not so much whether a straight-sided pin or a barrel-shaped pin was used, but whether the thread loading nearest the end faces of the electrodes exceeded a certain limit. In order to relieve the stresses supposedly concentrated at the flank portion of the threads nearest the electrode end faces, the socket threads simply were thinned or removed in this area so that the stresses would be shifted elsewhere. This approach, like those preceding, failed to yield acceptable results.

Lewis, U.S. Pat. No. 3,646,240, employed features of various prior art inventions as well as a different approach. Lewis utilized a barrel-shaped pin having a portion of the threads removed near the engaged faces of the electrode sections, somewhat rounded threads, and a bulbous counterbore forming the base of the socket. Lewis stated he "prevents the build up of destructive stress concentrations, such as thread roots at the base of the electrode socket". Lewis's approach employed features of prior art electrode socket designs with the addition of the voluminous counterbores "to transfer the load from electrode proper to joint threads and back again without destructive concentration of stress." The counterbores in Lewis intentionally were made exceedingly large to provide portions of the electrode less stiff than the electrode proper and thereby serve as flexible transition zones between the electrode proper and the connecting pin.

The primary shortcoming in Lewis's design stems from not removing the threads at the bottom of the socket, thus maintaining the stress concentration problem. Another problem associated with lewis's design results from the extreme size of the counterbore. Because the counterbore is so large, the wall thickness of the electrode section is reduced to the point where failure most likely will occur in the area of the counterbore. This is aggravated when the outer surface of the electrode has been attacked by oxidation. Hence, although Lewis recognized the base of the socket as a problem area, he did not solve the problem but only shifted it to another portion of the electrode section.

A more recent development in this area is shown by the patent to Kozak, U.S. Pat. No. 3,708,601. Kozak, like Lewis, recognized that a stress concentration area is the base of the socket and attempted to relieve stresses in this area. Kozak simply removed the last several threads near the base of the socket so that the connecting pin engaged all of the threads of the socket and extended slightly beyond the last socket thread without engaging the base of the socket. As a result of the thread removal, the notch angle between the last engaged socket thread and the socket wall is increased. According to Kozak, tests of his thread relief show reduced stress concentration on the order of thirteen percent compared to the designs discussed earlier. But, Kozak's structure fails to increase the socket strength sufficiently to satisfy the requirements of present-day industry.

While these and other attempts have been made to strengthen electrode section joints, the persistence of the problem itself simply demonstrates the shortcomings of those attempts. The physical properties of carbonaceous materials have seemingly not been fully understood at least from the standpoint of the configuration of mechanical components to provide section joints of maximized strength. While others have apparently recognized that excessive breakage occurs near socket bases, no one has found an appropriate solution of the problem.

SUMMARY OF THE INVENTION

The invention provides an electric-arc furnace electrode assembly having electrode sections of improved structural integrity. Electrode sections are held securely in end-to-end relationship by a pin threaded into a socket in the end of each electrode section.

The present invention recognizes that the most harmful stress concentrations occur near the base of the socket. By appropriate configuration of the socket in this region, the invention provides an electrode section wherein the stress concentration in the socket is reduced by more than fifty percent compared to a prior construction tested by the assignee of the present invention and improvements indicated by any test results of others known to the assignee. This result is in part achieved by providing a generous radius of curvature intermediate the lowermost socket thread and the base of the socket. That is, a circumferentially extending fillet relieves the area intermediate the socket thread nearest the base and the base of the socket. All of the socket threads are engaged and a threaded portion of the pin extends beyond the lowermost socket thread without engaging the base of the socket.

Alternative embodiments employ a circumferentially extending fillet adjacent the socket thread nearest the base the socket and a circumferentially extending fillet adjacent the base of the socket. The fillets may be connected by a straight, tapered section. By using any embodiment of the invention, stresses are relieved to the extent that an optimum failure condition is approached. Not only is a great saving of electrode material, mill down-time, and lost production realized, but the initial expense of the electrode assembly also can be reduced.

DESCRIPTION OF THE PREFERRED EMBODIMENT

Figure 1:
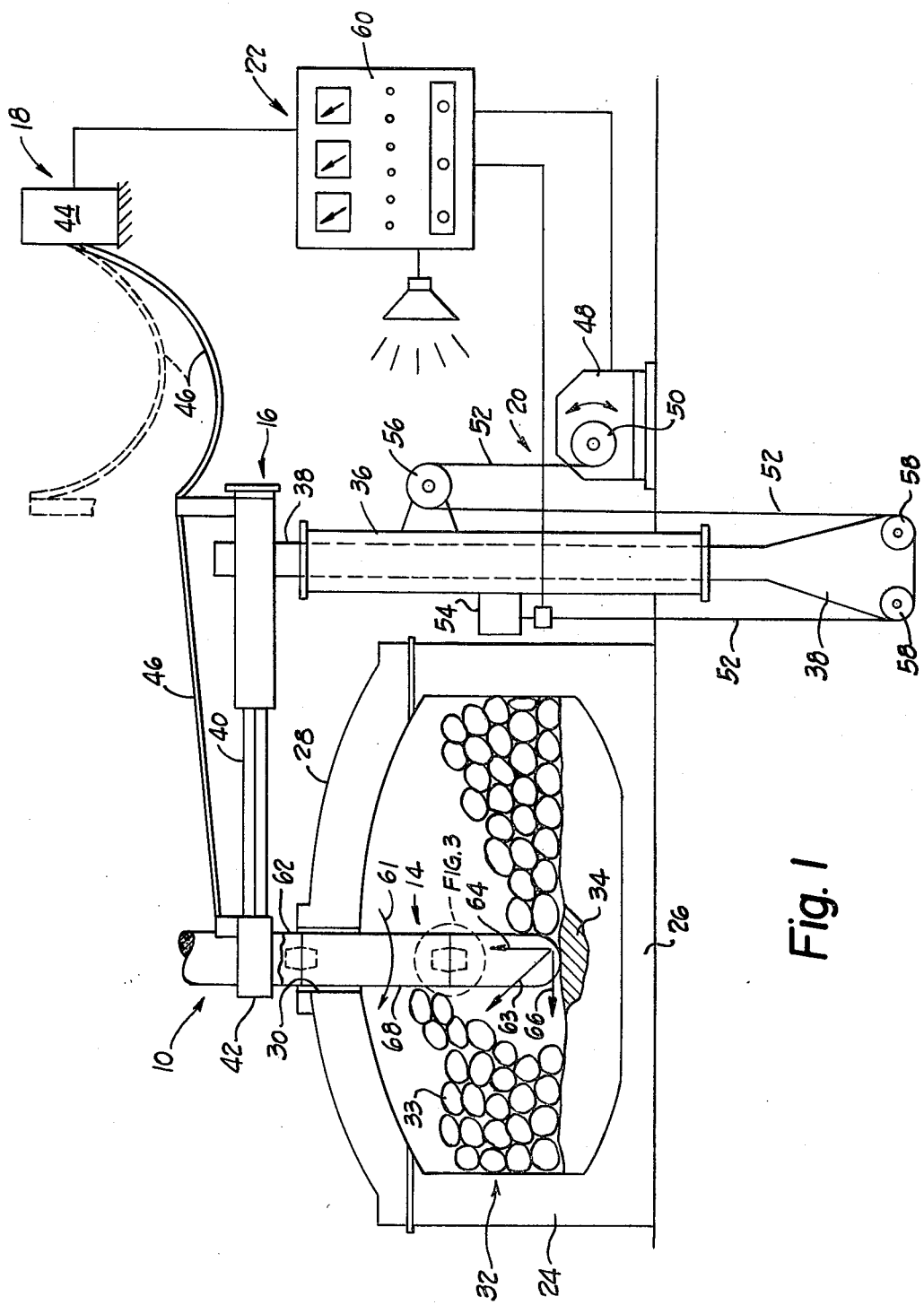
FIG. 1 is a schematic view of an electric-arc furnace in which the improved electrode socket of the present invention is used.

An electric-arc furnace system 10 is illustrated in FIG. 1 and includes an arc furnace 12. The furnace system includes an electrode assembly 14 which is supported by an electrode support structure 16. An arc power supply unit 18 provides arc-producing electric energy to the electrode assembly 14. A drive unit 20 is provided for positioning the electrode system with respect to the furnace 12. A control system 22 governs operation of the drive unit 20 to control the positioning of the electrode system with respect to the furnace.

The furnace system 10 preferably is a so-called three-phase furnace system which includes three electrode systems and their associated components. The furnace system 10 is illustrated with only one electrode system and its associated equipment for the sake of simplicity.

The furnace 12 includes a body 24 having a floor 26. A top or roof section 28 extends over the body 24 and has an opening 30 through which the electrode assembly 14 projects into the furnace. A charge of partially melted scrap material 32 is disposed within the furnace body 24 and includes a mound of scrap 33 into which the electrode assembly 14 extends as well as a nonconductive charge portion 34 located directly below the electrode assembly 14.

The electrode support structure 16 includes a stationary guide structure 36 situated near the furnace. A support column 38 is supported by the guide 36 for generally vertical movement relative to the furnace. A mast 40 extends from the support column 38 over the top of the furnace 12. An electrode holder 42 interconnects the mast 40 and the electrode assembly 14. The components of the support structure 16 can be of any suitable or conventional construction and therefore are not described in further detail.

The arc power supply unit 18 is illustrated schematically in FIG. 1 and includes a suitable power transformer 44 positioned near the furnace 12. A power cable 46 is slung between the transformer 44 and the electrode system so that electrical power for establishing an arc between the electrode assembly 14 and the furnace charge 32 is supplied to the electrode from the transformer 44 via the power cable 46. The cable 46 preferably is relatively slack to enable vertical movement of the electrode system relative to the furnace and the power supply unit 18 without over-stressing the power cable.

The drive unit 20 includes an electric drive motor 48 which is connected to the electrode system by a cable drive transmission to move the electrode system upwardly and downwardly. The cable drive transmission includes a winch 50 connected to an output shaft of the motor 48 and a cable 52 which is wound on the winch.

The cable 52 has a dead end which is fixed with respect to an anchor 54 on the guide structure 36. The cable 52 is reeved on a sheave 56 which is connected to the guide 36 and a pair of sheaves 58 which are supported at the lowermost end of the support column 38.

The control system 22 is housed in part behind a control panel 60 which is accessible to the furnace operator. The control system 22 is effective to govern operation of the drive motor 48 to control positioning of the electrode system relative to the furnace. The control system 22 is constructed and arranged so that the furnace operator manually can control positioning of the electrode system when desirable. The control system 22 also controls the motor 48 automatically in response to sensed conditions of which the operator may be unaware, as described more completely in U. S. Pat. No. 3,937,869.

The electrode assembly 14 is nonconsumable graphite electrode having a generally cylindrical, rod-like configuration formed by a series of joined electrode sections. The electrode assembly 14 projects generally vertically through the opening 30 into the furnace.

When the electrode assembly 14 bores down during the melting process, the mound of unmelted scrap 33 which surrounds the electrode assembly 14 may collapse and large chunks of scrap may strike the end of the electrode assembly. A bending load will be imposed on the assembly. The resultant bending moment, indicated at 61, is concentrated where the stresses are highest, usually near the uppermost electrode socket. The electrode socket is the weakest portion of the electrode assembly and failure commonly occurs here, for example, along a failure line indicated at 62.

When the electrode assembly 14 is lowered towards the furnace charge either upon initiating operation of the furnace system 10 or at some time during its operation, the possibility also exists that nonconductive furnace charge material may be located beneath the tip of the electrode. In these circumstances, an optimum arc is not established between the electrode and the charge and the control system 22 operates the motor 48 in a direction to drive the electrode into the charge.

When the electrode assembly engages the charge, the resultant force acting on the electrode, to the extent that the force is not aligned with the electrode axis, has a component force acting at right angles to the electrode axis, and a component force acting along or parallel to the electrode axis. Since the electrode assembly 14 has a low flexural strength, a relatively small component force acting at right angles to the electrode axis can load the electrode sufficiently to break it. This condition is illustrated in FIG. 1 with the resultant force indicated by the vector 63, the axial component force indicated by the vector 64, and the potential breaking force component indicated by the vector 66.

The electrode assembly 14 comprises a plurality of electrode sections 68 comprised of a largely amorphous, homogeneous carbonaceous substance such as carbon or graphite, capable of carrying an electric current and also capable of maintaining an appropriate arc in an electric-arc furnace. Each electrode section 68 is joined to a substantially identical electrode section 68 by means of a connecting pin 70. The connecting pin 70 preferably is comprised of the same material as that employed to form the electrode sections 68 and, accordingly, is capable of carrying an electric current and participating in the maintenance of an arc.

In a typical application, the electrode sections 68 may be twenty-four inches in diameter and ninety-six inches long. If a high-density material is chosen, each electrode section 68 may weigh over 2500 pounds. Because each electrode section must be able to carry its own weight plus that of any unconsumed electrode sections attached to it, as well as withstand any impact loads imposed during operation, it will be appreciated that the connecting pin 70 and the socket area of the electrode section 68 may be stressed considerably. As mentioned previously, the problem is aggravated because of the nature of the material employed for the electrode sections and the pins.

Figure 2:
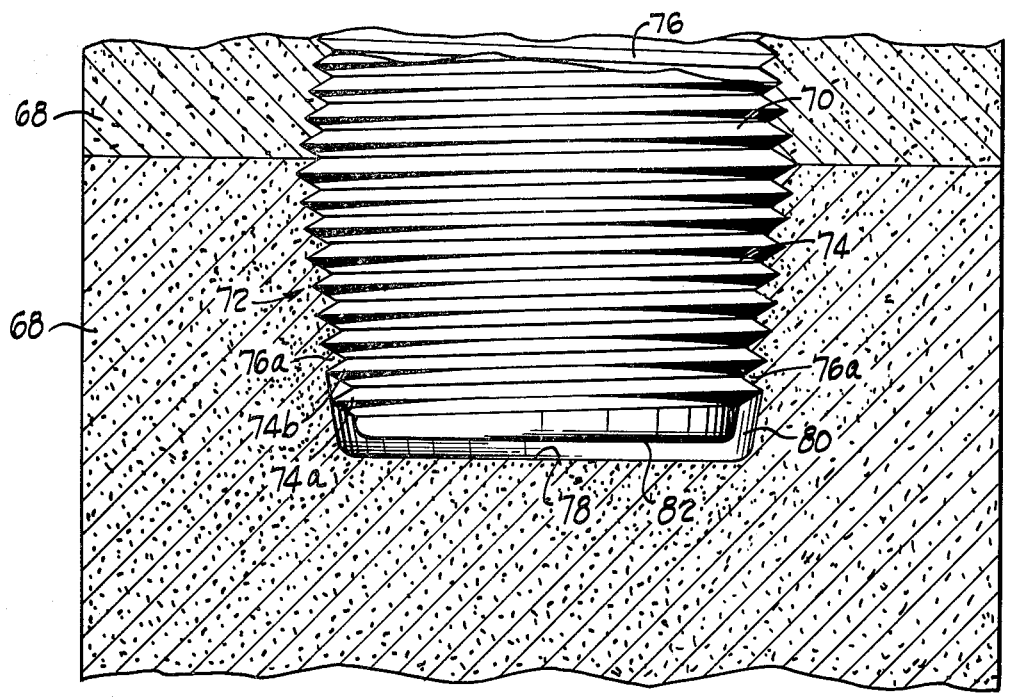
FIG. 2 is a view, partly in section, of a prior art electrode assembly having an electrode socket incorporating a thread relief near the base of the socket.

The prior art electrode assembly shown in FIG. 2 employs a barrel-shaped pin 70 and threaded sockets 72, one of which is disposed at each end of each electrode section 68. Each socket 72 is centered about the longitudinal axis of its electrode section and is oriented orthogonally to that axis so that upon a completed engagement with the pin 70, the electrode sections 68 will be joined in end-to-end, abutting relationship. The pin 70 is provided with a plurality of helical threads 74 and the socket 72 is provided with a plurality of helical threads 76 engageable with the threads 74 of the pin 70.

The threads 74, 76 are of conventional configuration. For example, the threads 74, 76 in a twenty-four inch diameter electrode section may have a pitch of 0.25 (i.e., four threads per inch), a flank angle of 30 degrees, a depth of 0.1601 inch, and a root radius of 0.0343 inch. Standards have been established for threads usable in electrode pins and sockets, and other appropriate thread configurations may be selected.

The threads 76 extend downwardly into the socket 72 toward a base 78 of the socket 72. A thread relief is provided intermediate the lowermost socket thread 76a and the base 78 of the socket 72. A longitudinally extending, tapered portion 80 defines the perimeter of a major part of the thread relief. The lowermost threads 74a, 74b of the pin 70 extend beyond the lowermost socket thread 76a toward the socket base 78. The pin 70 includes a flat bottom surface 82 spaced a short distance from the socket base 78.

The design of this prior art electrode assembly recognizes that harmful stress concentrations occur near the base of the socket and, because the lowermost socket threads serve as stress risers, provides a thread relief to remove these stress risers. More specifically, because all of the socket threads are engaged and the lowermost threads of the connecting pin extend beyond the lowermost socket thread, the concentration of stress has been relieved somewhat. Tests have indicated that improvements over other prior art designs have been only on the order of thirteen to fifteen percent. A much greater improvement is needed for modern-day industrial conditions, particularly considering the high cost of the electrode material, the time and expense needed to machine the electrode sections, as well as the great expense of mill down-time.

Figure 3:
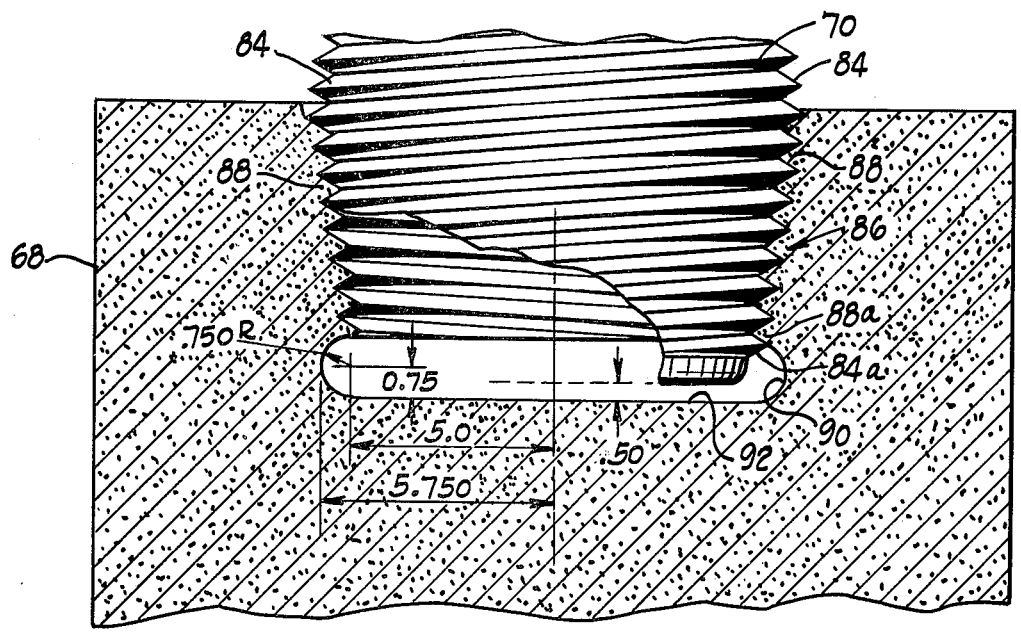
FIG. 3 shows the socket area of an electrode assembly according to the invention, illustrating in more detail the electrode socket of FIG. 1.
Figure 4:
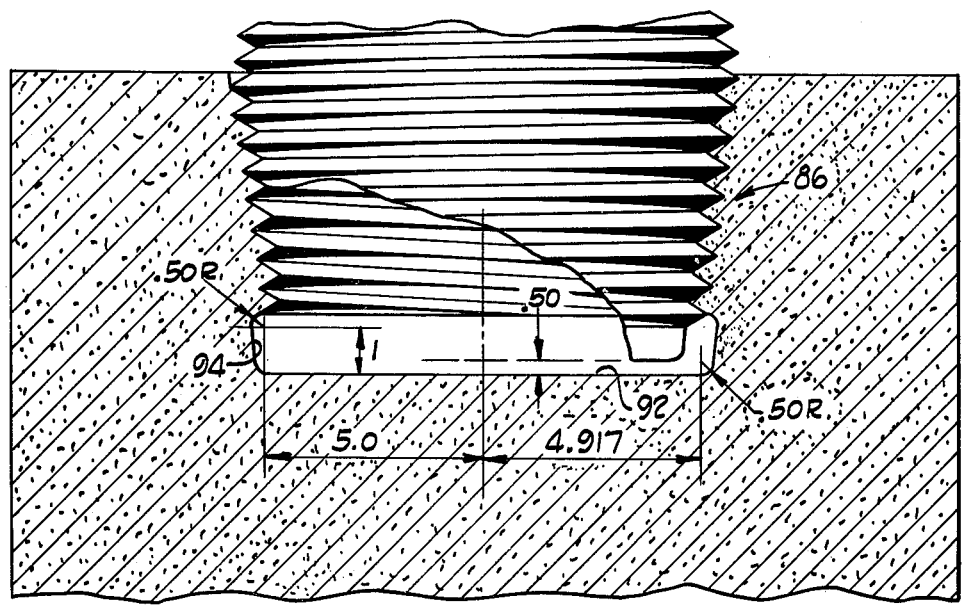
FIGS. 4 and 5 show alternative embodiments of an electrode socket according to the invention.
Figure 5:
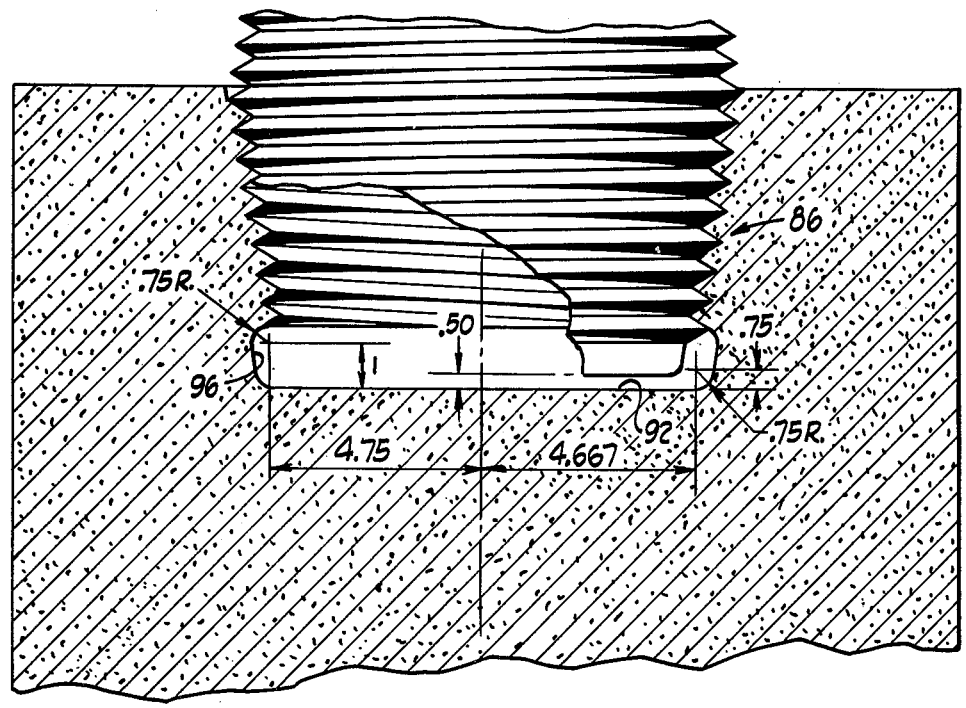

The invention illustrated by FIGS. 3, 4 and 5 provides a solution to these problems by providing an electrode assembly having sockets which are approximately twice as strong as those in prior art electrode assemblies. An electrode assembly 14 comprises a plurality of electrode sections 68 employing a connecting pin 70 having threads 84 as well as a socket 86 having threads 88. As in the prior art electrode assembly, the lowermost pin thread 84a extends below the lowermost socket thread 88a so that all of the socket threads are engaged. In order to achieve this, a base portion 90 is provided. Essentially, the base portion 90 is a circumferentially extending fillet formed intermediate the lowermost socket thread 88a and a flat base 92 of the socket 86. The base portion 90 uniformly distributes the high stresses found near the base of the socket and does this sufficiently well that strength improvements on the order of 50% have been demonstrated.

Because of the characteristics of carbonaceous electrodes, the reasons for the superiority of a connection of this invention may not be fully understood. It is believed that the marked improvement results from the configuration of the base portion 90, taken in conjunction with the structural properties of the electrode section 68 and the connecting pin 70. The ability of the electrode section to resist bending loads is a function of the stress concentrated near the base of the socket and this, in turn, is a function of the notch radius of that area of the electrode section intermediate the lowermost loaded socket thread and the base of the socket. A high stress concentration is instrumental in initiating cracks and consequent failure of the structure. It has been discovered that the consideration of crack initiation is particularly important when the material under consideration is non-ductile (or brittle) as with carbon, graphite, etc. By providing a generous radius of curvature intermediate the lowermost socket thread and the base of the socket, especially immediately adjacent the lowermost socket thread, the notch radius effectively is increased to the point where stress concentrations are distributed uniformly and the ultimate strength of the electrode section is increased.

The dimensions of the socket 86 and the base portion 90 shown in FIG. 3 provide an electrode assembly having the advantages of the invention. The alternative embodiments illustrated in FIGS. 4 and 5 likewise provide a base portion 94 and 96, respectively, having the advantages of the invention. The base portion 90 comprises a continuous radius of curvature which, in this particular configuration, is about 0.75 inch. The base portion 94 comprises two, 0.50 inch radii of curvature connected by a straight, tapered section; the base portion 96 is constructed similarly, but employs two, 0.75 inch radii of curvature. Regardless of the dimensions selected, it will be appreciated that the effective notch radius intermediate the lowermost socket thread 88a and the base 92 of the socket 86, particularly immediately adjacent the thread 88a, has been increased to the point where the stress concentrations are reduced greatly.

In each case, the pin bottom remains a short distance, here about 0.5 inch, from the socket base 92 when the pin 70 and the socket 86 are fully engaged. The exact spacing is not important, provided contact is avoided to prevent pre-stressing of the electrode section 68. Because of this spacing and the factors mentioned earlier as part of the invention, it now is possible for the electrode assembly to approach an optimum failure condition for the type of material employed for the electrode sections and the connecting pin.

Although the invention has been described with a certain degree of particularity, it is understood that the present disclosure of the preferred embodiment has been made only by way of example. Numerous changes in the details of construction of the electrode socket and its associated connecting pin may be resorted to without departing from the true spirit and scope of the invention and it is intended that the appended claims will cover all such changes.

We claim:

1. An electric-arc furnace electrodes comprising an elongate, carbonaceous electrode section having a socket adjacent one end, the socket extending longitudinally from an opening in an end surface of the electrode to a base, the socket having a threaded portion, the socket being adapted when in use to receive a threaded pin, the socket having a base portion between the base and the threaded portion when the electrode is in use such that the pin extends through the length of the threaded portion into the base portion and terminates at a location spaced from the base, the base portion comprising a circumferentially extending fillet having at least one circumferential, radiused surface intermediate the lowermost socket thread and the base of the socket, the base including a transversely extending surface which is as compared with the radiused surfaces relatively flat.

2. In an electrode assembly especially adapted for use in an electric-arc furnace:
   (a) a first elongate, carbonaceous, electrode section capable of carrying electrical current and being consumed during furnace operation;
   (b) a second elongate, carbonaceous, electrode section capable of carrying electrical current and being consumed during furnace operation;
   (c) each electrode section at each of its ends having a threaded socket extending longitudinally of the electrode section;
   (d) a threaded pin of an electrically conductive material consumable during furnace operation, the pin engagable at each end with a socket of an electrode section to permit the electrode sections to be joined in end-to-end, abutting relationship;
   (e) each socket having a base and a base portion extending circumferentially of the socket intermediate the socket thread nearest the base and the base, the base portion comprising a fillet including at least one circumferential surface of curved cross section; and
   (f) a portion of the pin extending beyond the thread nearest the base so that substantially all socket threads are engaged by the pin.

3. The electrode assembly of claim 2, wherein the base portion has two such curved surfaces a circumferentially extending fillet adjacent the socket thread nearest the base of the socket and a circumferentially extending fillet adjacent the base of the socket.

4. The assembly of claim 2 wherein the curved surface extends from the threads to the base.

5. The electrode assembly of claim 2 wherein the socket assembly thread is tapered and wherein the diameter of the fillet is less than the diameter of at least some of the thread and greater than other of the thread.

6. An electric-arc furnace electrode assembly, comprising:
   (a) an elongate, carbonaceous electrode section having a socket adjacent each end of the electrode section, each socket substantially centered about the longitudinal axis of the electrode section and oriented orthogonally to the axis, each socket opening in an end face of the electrode section and extending into the electrode section a predetermined distance, each socket having a base and helical threads intermediate the base and the end face of the electrode section, each socket haveing an unthreaded, circumferentially extending base portion near the base, the base portion immediately adjacent the socket thread closest to the base having a greater diameter than the socket thread closest to the base so that a recessed portion is formed, the recessed portion comprising in cross section a radius of curvature to increase the notch radius between the socket thread closest to the base and the base portion, and
   (b) a pin of carbonaceous material, the pin having helical threads and being sized appropriately to fit within the socket, the pin adapted to engage substantially all the socket threads but wherein the length of the pin is such that the pin is spaced from the base.

7. The electrode assembly of claim 6, wherein the recessed portion of the base portion comprises in cross-section a continuous radius of curvature intermediate the socket thread closest to the base and the base.

8. The electrode assembly of claim 6, wherein the base portion comprises in cross-section a first radius of curvature immediately adjacent the socket thread closest to the base, a second radius of curvature immediately the base, and a straight section connecting the first and second radii of curvature.

9. An electric-arc furnace electrode assembly, comprising:
   (a) an elongate, carbonaceous electrode section;
   (b) a pair of sockets each adjacent a different end of the electrode section, each socket substantially centered about the longitudinal axis of the electrode section and oriented orthogonally to the axis, each socket opening in an end face of the electrode section and extending into the electrode section a predetermined distance, each socket having:
      (i) a substantially flat base oriented orthogonally to the longitudinal axis of the electrode section;
      (ii) a plurality of helical threads; and
      (iii) a circumferentially extending base portion intermediate the base and the socket thread closest to the base, the base portion having no threads, a greater diameter than the socket thread closest to the base, and in cross section a radius; and
   (c) a carbonaceous pin, the pin having helical threads matable with substantially all the socket threads, the pin when fully screwed into the socket having an end surface spaced from the base of the socket.

10. The electrode assembly of claim 9, wherein the base portion in cross section comprises a first radius of curvature immediately adjacent the socket thread closest to the base, and a straight section connecting the first and second radii of curvature.

11. The assembly of claim 9 wherein the diameter of the base portion is less than a socket thread remote from the base.

12. The assembly of claim 9 wherein the base portion comprises a radius extending from the thread to the base.

* * * * *